May 14, 1929. S. N. TEVANDER 1,712,909
AIR TESTER
Filed May 2, 1927
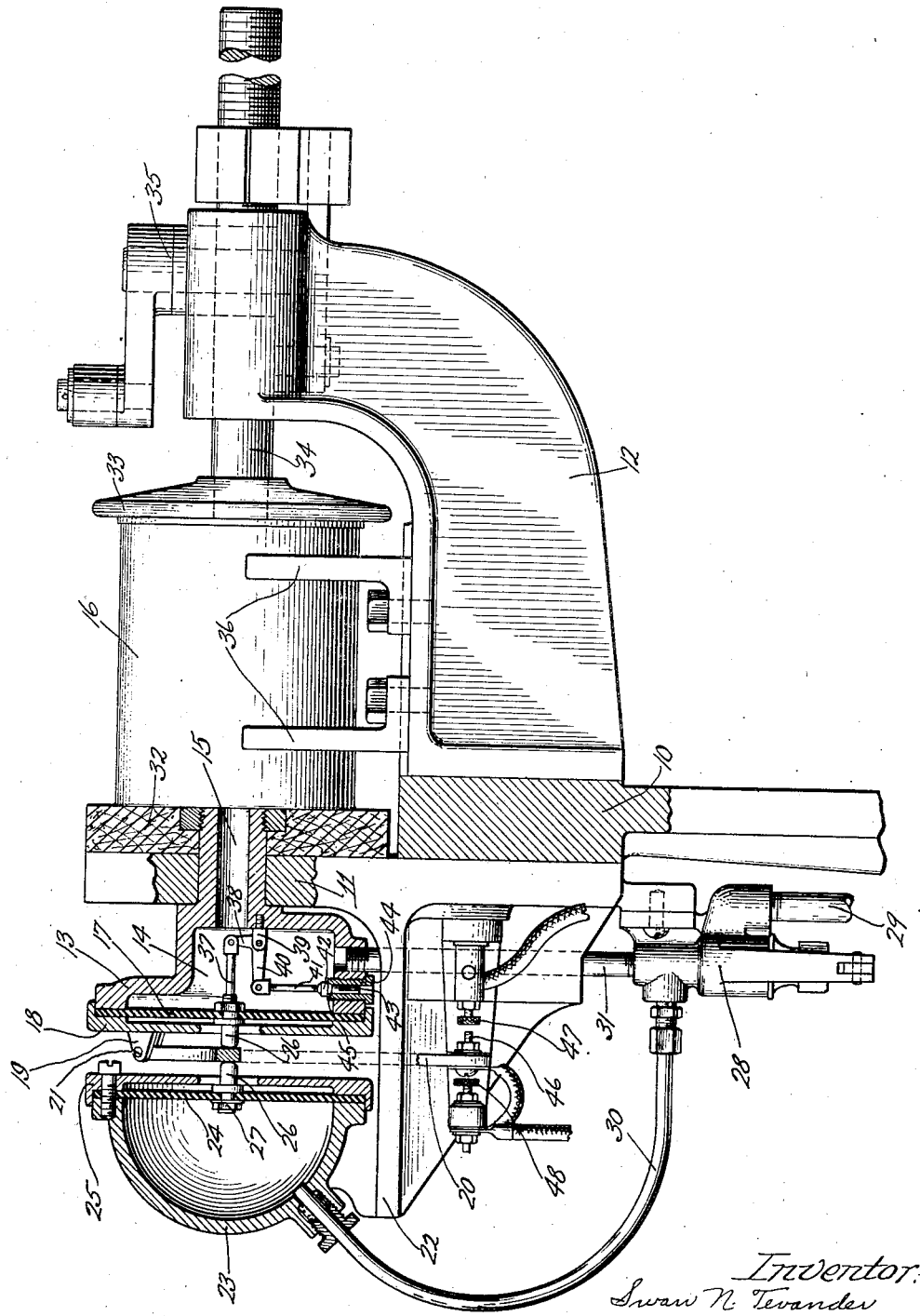
Inventor:
Swan N. Tevander
By Munday, Clarke & Carpenter
Attys.

Patented May 14, 1929.

1,712,909

UNITED STATES PATENT OFFICE.

SWAN N. TEVANDER, OF MAYWOOD, ILLINOIS, ASSIGNOR TO AMERICAN CAN COMPANY, OF NEW YORK, N. Y., A CORPORATION OF NEW JERSEY.

AIR TESTER.

Application filed May 2, 1927. Serial No. 188,143.

This invention relates in general to an air tester for cans and the like and has more particular reference to a leak increase valve for magnifying or quickly amplifying a detected minute leakage.

A principal object of the invention is the provision of means for automatically increasing a detected minute leakage.

A further object of the invention is the provision of mechanism for amplifying a minute leakage sufficiently to actuate a recording or operating mechanism.

A further object of the invention is the provision of a leak increase valve for a diaphragm air tester to protect the diaphragm.

A still further object of the invention is the provision of a leak increase valve for expediting a diaphragm action by magnifying a leakage detectable thereby.

Numerous other objects and advantages of the invention will be apparent as it is better understood from the following description, which, taken in connection with the accompanying drawing, discloses a preferred embodiment thereof.

The accompanying drawing illustrates a leak increase valve in connection with a double diaphragm air tester for cans, some of the parts being shown in elevation, and others in section.

In a diaphragm air tester, it is customary to utilize the movement of a diaphragm, even though it may be minute, for actuating an operating part, to record the variation of the diaphragm, or to utilize such variation to operate other mechanism. In testing cans, they are passed progressively through the air testing mechanism, and it may happen that the leakage is so minute that it will be in sufficient operatively to actuate the diaphragm in the time allowed for the air testing operation. This is particularly true if the parts become slightly worn, or if there is looseness or lost motion in certain of the operating parts.

The present invention overcomes these objections by producing a leak increasing valve connected for operation with the diaphragm and having a magnifying or amplifying action which is affected by the slightest variation of the diaphragm and may be arranged to magnify the action of the diaphragm so that even a slight variation thereof may be increased to actuate the leak increase valve.

Referring more particularly to the drawing, the invention is illustrated as applied to a double diaphragm air tester, in which there are a plurality of testing heads, similar to the one shown, mounted at the periphery of a wheel 10 (only a broken part of which is shown) which carries a testing head plate 11 at one side and a can supporting bracket 12 at the other.

Extending through and supported by the plate is a tubular member 13 forming a chamber 14 having a passage 15 extending therefrom through the plate for communication with a can 16 to be tested. Over the face of the chamber 14 is a diaphragm 17 held in place about the margin by a clamping plate 18 and provided with lugs 19 on the outer side for mounting an operating lever 20 to swing about the pivots 21 from the lugs 19.

Also supported from a shelf 22 of the plate 11 is a hollow member 23 having a diaphragm 24 arranged opposite and parallel to the other diaphragm 17 and held in place by a marginal clamping plate 25.

Each of the diaphragms carries a stud shaft 26 extending outwardly from the central portion of the diaphragm making an air-tight connection with the diaphragm to which it is secured as by a fastening nut 27 and having a rounded outer extremity, the rounded extremities of the opposite shafts 26 bearing oppositely upon the sides of the lever 20 mounted therebetween.

Fluid under pressure is admitted at the same time and under the same pressure to the chambers for both diaphragms by means of a valve 28 connected by a pipe 29 to a suitable source of pressure supply, the valve controlling the admission of fluid under pressure to the member 23 by means of a pipe 30 and to the chamber 14 by means of a pipe 31. This valve is operated to admit fluid under pressure to both of the chambers, the valve is then closed, and if the pressure in both diaphragm chambers remains the same there is no relative movement of the stud shafts 26 for moving the operating lever 20.

In order to hold a can 16 in air-tight connection with the chamber 14, a yielding abutment 32 is secured in place around the passage 15 of tubular member 13 to form a clamping base for the open end of the can 16 which is held tightly thereagainst by means of a clamping head 33 carried by a shaft 34 movbale in the outer end of the bracket 12 by means of a crank operated mechanism 35 which holds the can tightly upon the seat or abutment 32 while the can is under test. Circular supports 36 are provided on the bracket 12 for holding the cans in proper position with respect to the seat 32.

The leak increase mechanism is applied to the tubular member 13 within the chamber 14 and comprises a stud extension or stem 37 projecting from the stud shaft 26 of the diaphragm 17. Pivotally connected to the outer end of the stem 37 is a short arm 3C of a lever, preferably in the form of a bellcrank pivoted in a bracket 39 attached to the member 13 and having a long arm 40 pivoted at its outer end to a link 41 carrying a valve 42 with a ridged guide 43. This guide is slidable in an adjustable valve seat 44 having a valve seating surface 45 at its upper end for tightly engaging the valve 42.

With this construction it is obvious that a slight variation of the diaphragm 17 will cause a corresponding variation of the valve 42 upon its seat 45, and by properly proportioning the arms of the operating lever a minute action of the diaphragm is correspondingly amplified or magnified. This action raises the valve from its seat and increases the leakage from the chamber 14 so that the movement of the diaphragm not only is increased but also is expedited in the same direction. Thus in the case of a minute leak in the can under test, the operation of the leak increase valve will cause a sufficient variation, in the time under test, to actuate a recording mechanism, and in the case of a can tester, an ejecting mechanism.

For the purpose of recording the movement of the diaphragm or of ejecting a leaky can, the operating lever 20 carries a contact 46 for making electrical connection with an adjustable fixed contact 47, and a stop 48 is provided for engaging the contact lever in its other direction of movement, so that an unbalance of pressure applied to the diaphragms 17 and 24 will cause a corresponding movement of the lever 20 in one direction or the other. A release of pressure in the chamber 14 by the operation of the leak increase valve causes the lever to be moved in a direction to close the electrical connection.

As the leak increase mechanism is positively connected to the diaphragm 17, it will support and therefore protect the diaphragm against movement in a reverse direction occasioned by a leakage in the receptacle 23.

It is thought that the invention and many of its attendant advantages will be understood from the foregoing description, and it will be apparent that various changes may be made in the form, construction and arrangement of the parts without departing from the spirit and scope of the invention, or sacrificing all of its material advantages, the form hereinbefore described being merely a preferred embodiment thereof.

I claim:

1. In an air tester, a closed chamber with a movable diaphragm, and means for holding a can to receive air under pressure from said chamber, and means in connection with the diaphragm for increasing air leakage from the chamber.

2. An air tester for cans, comprising a diaphragm, means forming a chamber therefor in communication with a can to be tested, and leak increase mechanism movable with the diaphragm to amplify a leakage from the chamber dependent upon the movement of the diaphragm.

3. A testing chamber having a diaphragm and means for admitting fluid under pressure thereto, a leak increase valve for the chamber, and means connecting the valve for operation by the diaphragm, a movement of the diaphragm being amplified in the increase valve.

4. In an air tester, a tubular member having a diaphragm, a leak valve for the tubular member, and an amplifying mechanism connecting the valve and the diaphragm for moving the former in accordance with the movement of the diaphragm.

5. In an air tester, means forming a chamber with a diaphragm therefor, a leak increase valve comprising an inwardly movable valve member, and mechanism within the chamber positively connecting the diaphragm and the valve member for moving the latter in accordance with the movement of the diaphragm.

6. In leak increase mechanism for air testers, means forming a pressure chamber and a diaphragm actuated by pressure in the chamber, and a leak increase valve for opening the chamber to the atmosphere, said valve including an inwardly movable valve member, and an amplifying direction changing mechanism for moving the valve member inwardly an increasing amount, depending upon the inward movement of the diaphragm.

7. In a double diaphragm can tester, means forming a pair of opposite diaphragm chambers, adapted to receive a can to be tested in connection with one of the chambers, an operating member between the diaphragms, means in connection with the diaphragms for engaging the operating member, means for applying fluid pressure to both diaphragm chambers, a leak increase valve in connection with the diaphragm chamber to which a can to be tested is applied, and means for magnifying the opening of the valve depending upon a detectable variation of the diaphragm for the chamber to which the can under test is applied.

8. In an air tester, means forming a diaphragm chamber, a leak increase valve for said chamber, including a valve seat member and a valve therefor within the chamber and movable inwardly to oven the valve, and an amplifying mechanism comprising a lever connecting the valve and the diaphragm for increasingly moving the valve inwardly, depending upon an inward movement of the diaphragm.

9. In a leak increase mechanism for air testers, means forming a pressure chamber and a diaphragm therefor, a valve seat disposed inwardly of said chamber, a valve movable inwardly from the seat and having a ridged guide extending therein, a stem connected to and extending inwardly from the diaphragm, and a lever connected at its ends to the valve into the diaphragm stem for transmitting the inward movement of the diaphragm to move the valve inwardly from engagement with its seat.

10. In an air tester, a closed chamber with movable means variable under changes of pressure therein, and mechanism in the chamber actuated by change in pressure to cause a further variation in pressure and a consequent movement of said means.

11. In an air tester, means forming pressure chambers with opposite spaced diaphragms, means for applying equal pressure to the chambers, a movable member mounted between the diaphragms and operatively moved by a difference in pressure in the chambers, and air leakage means in connection with one of the chambers comprising a valve and means depending upon a small reduction of pressure in the chamber to open the valve and cause a further reduction of pressure in the chamber and a consequent movement of said movable member.

SWAN N. TEVANDER.